June 29, 1954 R. B. ROMANI 2,682,372
INCOME TAX CALCULATOR
Filed April 19, 1951
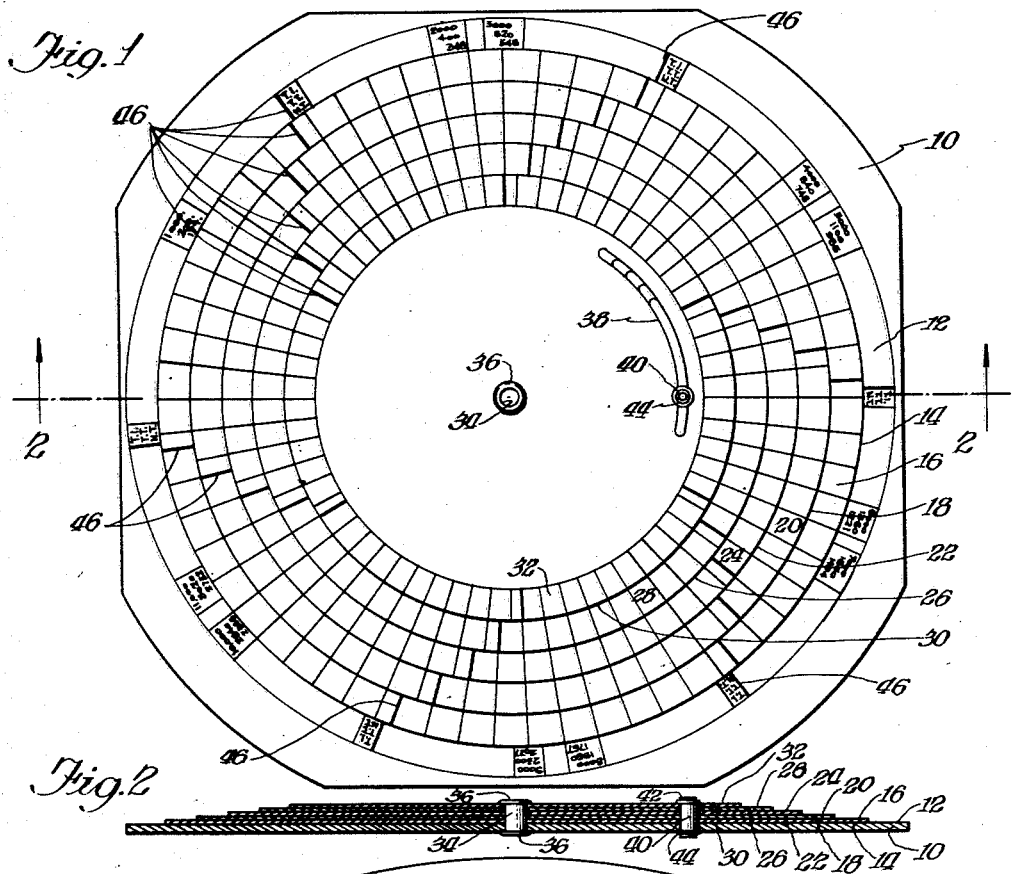
*Fig. 1*
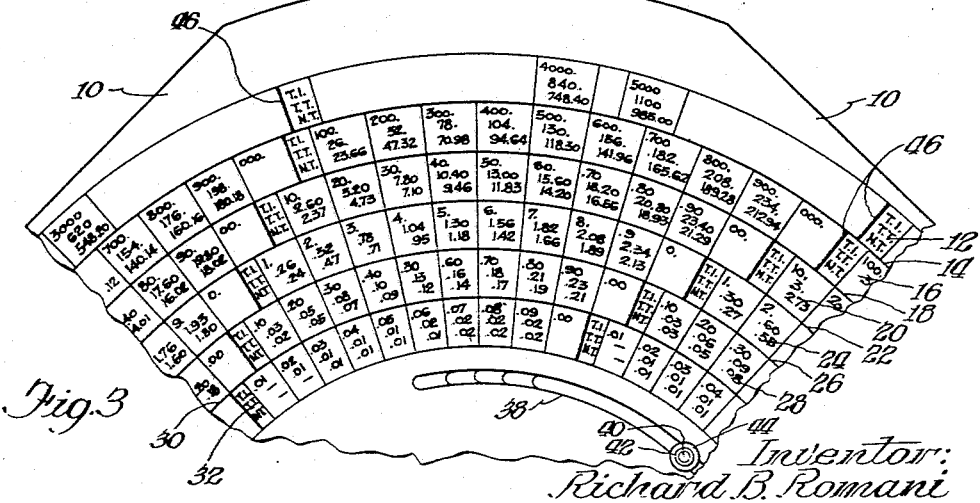
*Fig. 2*
*Fig. 3*
Inventor:
Richard B. Romani
By: Mann, Brown, and Hansmann
Attys.

Patented June 29, 1954

2,682,372

UNITED STATES PATENT OFFICE 2,682,372

INCOME TAX CALCULATOR

Richard B. Romani, Chicago, Ill.

Application April 19, 1951, Serial No. 221,836

10 Claims. (Cl. 235—88)

My invention relates to calculators for computing income taxes.

Under the present income tax regulations many millions of persons will file income tax returns, and the number will probably be increased in subsequent years. The number of man-hours expended in preparing and checking these returns, if calculated, would be, indeed, astounding.

At present, there has been made available three types of returns that an individual may file. They will here, for sake of brevity, be called Form 1040–A, Short Form 1040, and Long Form 1040. These various forms are provided in an effort to reduce the amount of time consumed in preparing and checking income tax returns, and also to make available to certain classes of people a simplified form on which they may file their income tax returns. Of these three forms only one may be said to be generic to all individuals, and this is Long Form 1040. The other two forms are limited in their scope of use. For instance, the 1040–A Form is limited almost exclusively to those with an income less than $5000, which income consists entirely of wages reported on withholding statements (Forms W-2). Short Form 1040 is limited in use to one having an income of less than $5000. When Short Form 1040 is used a standard deduction for contributions, medical and dental expenses, etc., is accepted and in many cases this will be disadvantageous.

In most cases it is desirable that the individual figure his tax in all of the alternative methods available. Thus, if a person comes within the scope of Short Form 1040 and calculates his tax thereon it would still be desirable to determine his tax under the method of Long Form 1040 in order to be certain that he is paying the least amount of income tax required.

From the foregoing it will appear that the greatest number of individual income tax returns will be calculated on Long Form 1040, whether they are submitted on that form or on the alternative Short Form 1040. It is when the tax is calculated under the provisions of Long Form 1040 that this invention is particularly useful.

In calculating income tax on the Long Form 1040, the adjusted gross income is arrived at by adding income from all sources such as wages, salaries, bonuses, commissions, etc. The deductions are listed under headings such as "Contributions," "Interest," "Medical expenses," etc., and the sum of the deductions is subtracted from the adjusted gross income, giving net income. From this figure is deducted an amount representing personal exemptions. This remaining sum is termed net taxable income. After arriving at this figure, according to Long Form 1040, the tax is calculated from certain mathematical computations. The amount of income tax due is determined in several ways depending upon whether the return is joint or separate. Assuming for the sake of illustration that the return is separate, the amount of the income tax is arrived at as outlined below:

A tax rate schedule based on net taxable income is provided to calculate the tentative tax. This tentative tax is determined by performing the mathematical steps of multiplication and addition. Then, at least three mathematical steps are performed on the amount of the tentative tax to determine a second figure. These steps may be subtraction, multiplication and addition. This second figure is then subtracted from the tentative tax to obtain the combined normal tax and surtax. An even greater number of mathematical steps must be performed if the return is joint. Under the present complex income tax rules it is becoming more and more beneficial for the individual to have his income tax return prepared by a person specializing in income tax work. Returns prepared by such persons are almost always filed on Long Form 1040, either of necessity due to the taxpayer's circumstances or to obtain the benefit of itemizing deductions. The number of income tax returns handled by such tax experts will ordinarily be appreciable and any saving in the amount of time consumed in preparing a return will be beneficial. A great deal of time is also consumed in checking the mathematical computations present in these returns after they are filed and any simplification of this checking process is most beneficial.

Accordingly, the principal object of my invention is to provide a tax calculator that quickly, easily, and accurately calculates the amount of income tax from the net taxable income.

Another object is to provide a calculator wherein from a single setting both the tentative tax and combined normal tax and surtax may be obtained.

Another object is to provide a tax calculator that is of a convenient size and which will calculate income taxes over a wide range of net taxable income values.

A further object is to provide a tax calculator which prevents mistakes brought about by the association of inappropriate scales.

A still further object is to provide a tax calculator that is dependable and accurate to within one cent.

These and other objects will become readily apparent from the following specification and the drawings, in which:

Figure 1 is a plan view of my calculator;

Figure 2 is a sectional view taken on line 2—2 of Figure 1; and

Figure 3 is a fragmentary view of my calculator showing the numerical values on the scales with the tax calculator set for a certain reading.

Referring now to the drawings, the calculator has a base 10, approximately square in shape, made of any suitable material, such as cardboard, plastic, sheet metal or the like. The base 10 has formed thereon an annular scale which will be called the 1000-scale 12. Disposed upwardly of the base 10 is a disc 14 having formed on its upper face an annular scale called 100-scale 16. Disposed upwards from the disc 14 is another disc 18 having formed on its upper face an annular scale, called 10-scale 20. Three discs 22, 26 and 30, each of a progressively smaller diameter, are disposed above disc 18 and have formed on their upper faces digit-scale 24, tenths-scale 28, and hundredths-scale 32, respectively, each scale being annular in configuration.

Each of these discs are formed with a hole at their center, and base 10 has a similar hole formed at its center. The discs and base are held in alignment by a cylindrical pin 34, placed through the holes in the discs and the hole in the base, and are held together by means of a rolled-over portion 36 on the pin 34, with each disc free to rotate with respect to each other disc and with respect to the base 10.

In each of the discs there is formed an arcuate slot or opening 38. The slot in each disc has the same radius of curvature and the same arc length. The base 10 is provided with a hole disposed from the center of the base a sufficient distance to correspond to the arcuate slots 38. A cylindrical pin 40 is inserted through the hole in the base and the slots 38 and washers 44 are placed over the portion of the pin 40 extending above disc 30 and the portion of the pin 40 extending below base 10. The upper and lower ends of the pin 40 are then formed with a rolled-over portion 42 that engages the washers 44. Since the washers 44 are larger than the width of slot 38 and the diameter of the hole in base 10, the pin is effectively held within the slots 38 and the hole in the base 10. The pin 40 is adapted to fit loosely to permit rotation of the discs relative to the base, the extent of the rotation of each disc relative to the base being limited by the arc length of the slot 38 in that disc.

In order to understand the operation of my calculator, it is necessary that the basis on which income taxes are calculated be understood. The following tax rate schedule illustrates how tentative tax is calculated from net taxable income under the present income tax regulations.

| Net Taxable Income | Tentative Tax |
|---|---|
| Not over $2,000 | 20% of the net taxable income. |
| Over $2,000 but not over $4,000 | $400 plus 22% of the net taxable income over $2,000. |
| Over $4,000 but not over $6,000 | $840 plus 26% of the net taxable income over $4,000. |
| Over $6,000 but not over $8,000 | $1,360 plus 30% of the net taxable income over $6,000. |
| Over $8,000 but not over $10,000 | $1,960 plus 34% of the net taxable income over $8,000. |
| Over $10,000 but not over $12,000 | $2,640 plus 38% of the net taxable income over $10,000. |
| Over $12,000 but not over $14,000 | $3,400 plus 43% of the net taxable income over $12,000. |
| Over $14,000 but not over $16,000 | $4,260 plus 47% of the net taxable income over $14,000. |
| Over $16,000 but not over $18,000 | $5,200 plus 50% of the net taxable income over $16,000. |
| Over $18,000 but not over $20,000 | $6,200 plus 53% of the net taxable income over $18,000. |
| Over $20,000 but not over $22,000 | $7,260 plus 56% of the net taxable income over $20,000. |
| Over $22,000 but not over $26,000 | $8,380 plus 59% of the net taxable income over $22,000. |
| Over $26,000 but not over $32,000 | $10,740 plus 62% of the net taxable income over $26,000. |
| Over $32,000 but not over $38,000 | $14,460 plus 65% of the net taxable income over $32,000. |
| Over $38,000 but not over $44,000 | $18,360 plus 69% of the net taxable income over $38,000. |
| Over $44,000 but not over $50,000 | $22,500 plus 72% of the net taxable income over $44,000. |
| Over $50,000 but not over $60,000 | $26,820 plus 75% of the net taxable income over $50,000. |
| Over $60,000 but not over $70,000 | $34,320 plus 78% of the net taxable income over $60,000. |
| Over $70,000 but not over $80,000 | $42,120 plus 81% of the net taxable income over $70,000. |
| Over $80,000 but not over $90,000 | $50,220 plus 84% of the net taxable income over $80,000. |
| Over $90,000 but not over $100,000 | $58,620 plus 87% of the net taxable income over $90,000. |
| Over $100,000 but not over $150,000 | $67,320 plus 89% of the net taxable income over $100,000. |
| Over $150,000 but not over $200,000 | $111,820 plus 90% of the net taxable income over $150,000. |
| Over $200,000 | $156,820 plus 91% of the net taxable income over $200,000. |

If, for example, a person's income was $4500, from the table it will be seen that his tentative tax is $840, plus 26% of $500, which is $130, giving a total of $970. In order to calculate the combined normal tax and surtax it is then necessary to use one of three formulas. If the tentative tax is (a) not over $400, take 13% of the tentative tax, (b) over $400 but not over $100,000 add 9% of the tentative tax in excess of $400 to $52, and (c) over $100,000 add 7.3% of the excess over $100,000 to $9,016. It will be seen in our example that (b) is applicable and that $52 plus 9% of $570 is equal to $103.30. This amount is then subtracted from the tentative tax gixing a combined normal tax and surtax of $866.70. This sample calculation serves to illustrate the manner in which income tax is computed.

Referring to Figure 1, it will be seen that the scales are divided into six arcuate sections, as indicated by the heavy lines 46. These lines 46 are shown as being heavier than the rest only to point out how the scales are divided. This particular number of arcuate sections is chosen in this particular tax calculator to enable an operator to determine the income tax on net taxable incomes of from zero to $12,000. In other words, this calculator is adapted to compute income tax on the net taxable incomes for the first six ranges shown in the tax rate schedule.

Referring now to Figure 3, the relationships of the figures on each scale there shown will be determined. Figure 3 shows that part of the calculator associated with the third range of the tax rate schedule which covers from $4000 to $6000 of net taxable income.

As illustrated on the left-hand and right-hand sides of Figure 3, the sections of each scale are separated from the adjacent sections on that scale by an index portion containing the initials "T. I.," "T. T.," and "N. T." These initials refer to, respectively, taxable net income, tentative tax, and combined normal tax and surtax.

On each section of the scales ten equal intermediate arcuate portions are formed by radial lines, the arcuate portions of each scale becoming progressively smaller from the 1000-scale 12 to the hundredths-scale 32. Opposite the initials "T. I." on each scale are the numbers relating to the net taxable income and progress from 100 to 900 on the 100-scale; from 10 to 90 on the 10's-scale; from 1 to 9 on the digit scale; from .1 to .9 on the tenths-scale; and from .01 to .09 on the hundredths-scale.

The 1000-scale 12 has two arc portions formed near the center of this section, one representing $4000 net taxable income, and the other representing $5000 net taxable income.

Referring again to the third line of the tax rate schedule given above, it will be noted that the tentative tax is calculated by adding 26% of the tentative tax over $4000 to $840. The $840 figure is arrived at by taking 20% of $2000, plus 22% of $2000. It will be noted in Figure 3 that $840 appears below the $4000 on scale 12, in line with the initials "T. T." To calculate the tax on $5000, again referring to the tax rate schedule, one must add to $840 26% of $1000, which gives the tentative tax of $1100. This figure appears opposite the initials "T. T." and under the $5000 on scale 12. From the tax rate schedule it can be calculated that for each $100 of taxable net income over $4000 but under $6000, the tentative tax would be 26% of $100, or $26.00. Thus, for the $100 between $4000 and $4100 the tax would be $26.00. Likewise, the tax for the $100 between $5000 and $5100 would be $26.00.

Referring now to Figure 3 and to the left-hand portion of 100-scale 16, $26.00 appears under the net taxable income $100 in a line with the initials "T. T." Since each $100 above $4000, but under $6000, has a tentative tax of $26, each $200 would have a tax of $52, and each $300 a tax of $78, etc. (each tentative tax being a product of $26 times the number of hundreds). These figures of $52, $78, etc. appear in the $200, $300, etc. portions of 100-scale 16. The same sort of calculation can be carried out for $10 portions of 10-scale 20 with the result that each $10 interval will have a tentative tax of $2.60. The 10-scale 20 of Figure 3 is filled out on this basis: The digit-, tenths-, and hundredths-scales are filled out by the same method.

It should be noted that a slight discrepancy exists between the actual tentative tax and the tentative tax recorded on the tenths- and hundredths-scales, but this discrepancy is in thousandths of a cent, and for all practical purposes the values for the hundredths and tenths scale may be taken as the nearest whole cent. For instance, 26% of ten cents is 2.6 cents, which will be recorded on the tenths-scale 28 as 3 cents.

The tentative tax figures for the other divisions of the calculator will be calculated in a manner similar to the calculations shown above for the $4000 to $6000 section using the figures set forth in the preceding tax rate schedule that corresponds to the particular divisions under consideration.

As previously mentioned, the combined normal tax and surtax is calculated by using one of three formulas depending upon the amount of the tentative tax. Since in Figure 3 we are dealing in the range of taxable net income between $4000 and $6000, which makes the tentative tax greater than $400, Formula b will be used and the amount to be subtracted from the tentative tax to obtain the combined normal tax and surtax is $52 plus 9% of the excess tentative tax over $400. For a taxable net income of $4000, this figure would be $52 plus 9% of $440, or a total of $91.60. Subtracting $91.60 from the tentative tax $840 associated with a net taxable income of $4000, the result is a combined normal tax and surtax of $748.40. It will be noted on Figure 3 that this amount of tax is marked in the $4000 portion of 1000-scale 12 in line with the initials "N. T." A similar calculation is carried out for $5000 and the result of $985 appears opposite the initials "N. T." in the $5000 portion of 1000-scale 12.

For each $100 between $4000 and $6000 it may be determined that the net tax is $23.66. Since the tentative tax in this division or sector of the calculator is over $400 the amount to be subtracted from the tentative tax in order to yield the combined normal tax and surtax is determined by adding $52 to 9% of the tentative tax in excess of $400. As noted above, the $52 has been taken into account in the $4000 and $5000 portions of 1000-scale 12. Therefore, it is not necessary to take this $52 figure into account in the 100-, 10-, etc. scales. Thus, in order to calculate the combined normal tax and surtax for the $100 portion of 100-scale 16, one must take 9% of the tentative tax, $26, and subtract this amount from the tentative tax, which yields a combined normal tax and surtax of $23.66. This figure represents the combined normal tax and surtax for each $100 interval between $4000 and and $6000. Hence, to obtain the combined normal tax and surtax for the $200, $300, $400, etc., portions of 100-scale 16 one need only multiply $23.66 by 2, 3, 4, and so forth. This is clearly shown in Figure 3.

What has been said with respect to the 100-scale 16 is equally applicable to the 10's-, digit-, tenths- and hundredths-scales, except that the actual value of the combined normal tax and surtax will be approximately .1, .01, .001, and .0001, respectively, of the amount shown on 100-scale 16.

The method of calculating the combined normal tax and surtax for each of the scales in the other sectors of the calculator is substantially the same, but particular attention must be paid to the amount of tentative tax associated with each section in order to ascertain whether Formula a, b, or c is applicable. For instance, the tentative tax from zero to $2000 does not exceed $400, therefore the combined normal tax and surtax for the scales within this sector of the calculator is computed by taking 13% of the tentative tax and subtracting this figure from the tentative tax. If the calculator is made to cover a sufficiently wide range of net taxable income values to make the tentative tax over $100,000, the combined surtax and normal tax must be calculated from Formula c which reads $9016 plus 7.3% of the excess over $100,000.

In order to indicate how the other scales in other sectors of the calculator are filled out, the lower right-hand side of Figure 3 shows a part of the 10's-, digit-, tenths-, and hundredths-scales of the division or sector of the calculator for the net taxable income range of $6000 to $8000, and upper left-hand side of Figure 3 shows a part of the 100-, 10-, digit-, and tenths-scales of the sector of the calculator for the net taxable income range of $2000 to $4000.

From the foregoing calculation, demonstrating how the figures inscribed on the scales were obtained, it will be noted that the tentative tax and combined normal tax and surtax figures associated with corresponding net taxable income portions of the several sections of a given scale will not be the same. As an example, the $900 portion of the 100-scale 16 in the $4000 to $5000 section has a tentative tax of $234, and a combined normal tax and surtax of $212.94, while the $900 portion of the 100-scale 16 in the $2000 to $3000 section has a tentative tax of $198 and a combined normal tax and surtax of $180.18.

It is necessary to provide a means to prevent the operator from inadvertently aligning scale portions from different sectors to obtain the tax, since such a tax would be erroneous.

The scale sections inscribed with figures computed on the basis of a range of net taxable income from the tax rate schedule have been called a division or sector of the calculator.

As previously mentioned the extent of the rotation of each disc relative to the base 10 is limited by the arcuate slot 38 and pin 40. By making the length of the arcuate slot 40 approximately equal to the length of an arc drawn at the radius of the slot between the radial lines bounding a sector, the possibility of obtaining in erroneous tax from aligning scale portions from different sectors is substantially eliminated. In a preferred embodiment of my invention alternate sectors of the calculator are of one color while the other sectors are of another color. By using this coloring scheme any alignment of the end portions of the scales of one sector with the portions of the scales of another sector is visually evident.

As an example of how my calculator operates, the scales illustrated on Figure 3 have been set to give the tentative tax and the combined normal tax and surtax for a net taxable income of $4567.89. In order to calculate the tentative tax the numbers in the scale portions, including the number in the $4000 portion, aligned with the $4000 portion and in a circumferential line with the initials "T. T." on each scale are added. Performing such addition it will be noted that the tentative tax is $987.65.

In order to calculate the combined normal tax and surtax one need only add the numbers in the portions aligned with the $4000 portion and in a circumferential line with the initials "N. T." Performing this addition, the combined normal tax and surtax is found to be $882.77.

Thus, it appears that by setting the tax calculator at the amount of net taxable income both the tentative tax and combined normal tax and surtax are obtained by performing the simple step of addition.

As shown in Figure 3, each section of the scales on the discs is divided into eleven portions. The first portion is an index portion containing the indexing initials. The other ten portions are of equal arc length. The right-hand portion of each scale section is the zero portion. These zero portions are provided to permit the operator to obtain the tentative tax and combined normal tax and surtax in exactly the same manner described above whenever the net taxable income figure contains a zero. As an example, if the net taxable income is $4067.89 instead of $4567.89, the zero portion of the 100-scale 16 would be set under the $4000 portion of 1000-scale 12.

While the calculator herein described has been shown to have six divisions or sectors it is readily apparent that this number may be either increased or decreased to cover a greater or lesser range of net taxable incomes. For example, the tentative tax and combined normal tax and surtax for net taxable incomes of from zero to $100,000 could be arranged on a calculator identical to this by providing twenty-one sectors corresponding to the twenty-one ranges of the tax rate schedule. If it were desirable to construct a calculator to yield tentative tax and combined normal tax and surtax on net taxable incomes of more than $100,000, an additional $100,000 scale must be added. This would be effected by placing the 1000-scale, herein shown on base 10, on a disc and forming the $100,000 scale on the base.

From the foregoing it will be seen that my invention provides a simple, inexpensive, and accurate tax calculator that is fast in operation and which prevents mistakes due to the association of inappropriate scales.

I claim:

1. In an income tax calculator, a plurality of stacked discs having progressively decreasing diameters, means connecting said discs in axial alignment in the order of their progressively decreasing diameters for relative movement of said discs about said means, annular scales formed on the adjacent exposed surfaces of each of said discs corresponding to a predetermined increment of net taxable income assigned to each of said discs, each of said annular scales being divided into a plurality of arcuate sections with each section containing fractional subdivisions of said increment of net taxable income and the associated rated income tax applicable thereto, said arcuate sections being defined by radial lines forming a certain angle at said axial connecting means and stop means to limit the relative movement of said discs to substantially said certain angle.

2. In an income tax calculator, a plurality of stacked discs having progressively decreasing diameters, means connecting said discs in axial alignment in the order of their progressively decreasing diameters for relative movement of said discs about said means, annular scales formed on the adjacent exposed surfaces of each of said discs corresponding to predetermined increments of net taxable income assigned to each of said discs, each of said annular scales being divided into sections and portions by radial line projections with each of said sections containing a plurality of said portions, figures formed on said portions representing net taxable income and the associated rated income tax, said figures in each section corresponding to frictional subdivisions of said assigned predetermined increment of net taxable income and to said associated rated income tax, and stop means to limit the relative movement of said discs to substantially the angle described between the radial line projections defining the extent of one of said sections, wherein the income tax for a given amount of net taxable income is found by radially aligning the portions of said scales corresponding to the increments defined by said given amount and adding the figures in the aligned portions corresponding to the income tax.

3. In an income tax calculator, a plurality of stacked discs having progressively decreasing diameters, means to axially interconnect said discs in the order of their progressively decreasing diameters for relative rotary movement of said discs, annular scales formed on the adjacent exposed surfaces of said discs, said annular scales being divided into sections and portions by radial line projections with each of said sections containing a plurality of said portions, figures formed on said portions of the discs representing net taxable income, tentative tax, and combined normal tax and surtax, said figures in each section corresponding to the decimal subdivisions of net taxable income, tentative tax for said decimal subdivisions and combined normal tax and surtax for said decimal subdivisions for an income tax rate based on a range of net taxable income, coinciding arcuate channels formed in said discs having an arc length substantially determined by a pair of radial line projections dividing said scales into said sections, a pin inserted in said channels, said pin limiting the relative rotary movement of said discs, wherein the tentative tax and combined normal tax and surtax for a given amount of net taxable income is found by radially aligning the portions of said scales corresponding to the decimal subdivisions of said given amount and adding the figures in the aligned portions corresponding to the tentative tax and combined normal tax and surtax.

4. An income tax calculator comprising a plurality of discs, a base, said discs being stacked above said base, means connecting said discs and base in axial alignment for relative movement, exposed annular scales of net taxable income and income tax on said base and discs, means to divide said scales into arcuate sections, said arcuate sections having equal included axial angles, and means to limit the relative movement of said base and discs to an angle approximately equal in degrees to said included axial angle, wherein each arcuate section of the scale on said base is inscribed with the thousands of net taxable income and income tax derived from said thousands corresponding to one of the ranges of income tax rates, and each arc section of the scales on the discs is inscribed with the fractional subdivisions of net taxable income and income tax derived from said fractional subdivision corresponding to one of said ranges.

5. An income tax calculator comprising five discs, a base, said discs being stacked above said base, means connecting said discs and base for relative movement, exposed annular scales of net taxable income and income tax on said base and discs, means to divide said scales into arcuate sections, said arcuate sections having equal included axial angles, wherein each arcuate section of the scale on said base is inscribed with the thousands of net taxable income and income tax derived from said thousands corresponding to one of the ranges of income tax rates, each arcuate section of the scale on a first disc is inscribed with the hundreds of net taxable income and income tax derived from said hundreds corresponding to one of said ranges, each arcuate section of the scales on a second disc is inscribed with the tens of net taxable income and income tax derived from said tens corresponding to one of said ranges, each arcuate section of the scales on a third disc is inscribed with the digits of net taxable income and income tax derived from said digits corresponding to one of said ranges, each arcuate section of the scales on a fourth disc is inscribed with the tenths of net taxable income and income tax derived from said tenths corresponding to one of said ranges, and each arcuate section of the scales on a fifth disc is incribed with the hundredths of net taxable income and income tax derived from said hundredths corresponding to one of said ranges, and means to limit the relative movement of said discs and base to retain the arcuate sections of the scales on the base and discs corresponding to one of the ranges of income tax rates in partial radial alignment at all times.

6. An income tax calculator for determining the amount of income tax from net taxable income comprising a base, an annular scale formed on said base, a first disc containing a first annular scale, a second disc containing a second annular scale, a third disc containing a third annular scale, a fourth disc containing a fourth annular scale, a fifth disc containing a fifth annular scale, said discs being stacked above said base in the order listed and having said scales exposed radially adjacent each other, each of said annular scales corresponding to a predetermined increment of net taxable income assigned to said scales, means connecting said discs and said base in axial alignment for relative movement, said annular scales being divided into arcuate sections and portions by radial line projections with each of said sections containing at least one of said portions, figures formed on said portions representing net taxable income and the associated rated income tax, said figures in each section corresponding to fractional subdivisions of said assigned predetermined increments of net taxable income and to said associated rated income tax, wherein each section of the scale on the base contains the thousand figures of net taxable income on which there is a constant predetermined income tax and each section of the first, second, third, fourth, and fifth scales contains the hundreds, tens, digits, tenths, and hundredths figures, respectively of net taxable income, and means to limit relative movement of said discs and base to substantially the angle described between the radial line projections defining the extent of one of said sections.

7. In an income tax calculator, a plurality of stacked plates of progressively decreasing sizes, means connecting said plates in the order of their progressively decreasing sizes for relative movement of said plates, said relative movement being constrained by said connecting means, scales formed on the adjacent exposed surfaces of each of said plates corresponding to predetermined increments of net taxable income assigned to each of said plates, each of said scales being divided into a plurality of peripheral sections with each section containing fractional subdivisions of said increments of net taxable income and the associated rated income tax applicable thereto, said peripheral sections being defined by spaced lines directed perpendicular to the periphery of said plates at the location of said lines and stop means to limit the relative movement of said plates to substantially one of said sectional spaces.

8. In an income tax calculator, a plurality of stacked plates having progressively decreasing sizes, means connecting said plates in the order of their progressively decreasing sizes for relative movement of said plates, said relative movement being constrained by said connecting means, scales formed on the adjacent exposed surfaces of each of said plates corresponding to predetermined increments of net taxable income assigned to each of said plates, each of said scales being divided into sections and portions by spaced line projections directed perpendicular to the periphery of said plates at the location of said lines, each of said sections containing a plurality of said portions, figures formed on said portions representing net taxable income and the associated rated income tax, said figures in each section corresponding to fractional subdivisions of said assigned predetermined increments of net taxable income and to said associated rated income tax, coinciding channels formed in said plates having a length substantially determined by a pair of spaced lines dividing said scales into one of said sections, said channels being directed substantially perpendicular to said spaced line projections, a pin inserted in said channels, said pin limiting the relative movement of said plates, wherein the income tax for a given amount of net taxable income is found by aligning the portions of said scales corresponding to the fractional subdivisions of said given amount and adding the figures in the aligned portions corresponding to income tax, said portions being aligned perpendicular to the periphery of said plates.

9. In an income tax calculator, a plurality of stacked discs having progressively decreasing diameters, means connecting said discs in axial alignment in the order of their progressively decreasing diameters for relative movement of said discs about said means, and annular scales formed on the adjacent exposed surfaces of each of said discs corresponding to a predetermined increment of net taxable income assigned to each of said discs, each of said annular scales being divided into a plurality of major arcuate sections with each of said sections having a plurality of minor sections containing fractional subdivisions of said increment of net taxable income and the associated rated income tax applicable thereto, all the minor sections of each major section on one disc being correlated with the minor sections of the corresponding major sections of each of the other discs.

10. In an income tax calculator, a plurality of stacked plates of progressively decreasing sizes, means connecting said plates in the order of their progressively decreasing sizes for relative movement of said plates, said relative movement being constrained by said connecting means, and scales formed on the adjacent exposed surfaces of each of said plates corresponding to predetermined increments of net taxable income assigned to each of said plates, each of said scales being divided into a plurality of major peripheral sections with each section having a plurality of minor sections containing fractional subdivisions of said increments of net taxable income and the associated rated income tax applicable thereto, all the minor sections of each major section on one plate being correlated with the minor sections of the corresponding major sections of each of the other plates.

References Cited in the file of this patent

UNITED STATES PATENTS

| Number | Name | Date |
|---|---|---|
| Re. 10,592 | Child | May 5, 1885 |
| 563,778 | Loyd | July 14, 1896 |
| 865,808 | Stump | Sept. 10, 1907 |
| 998,603 | Diefenback | July 25, 1911 |
| 1,145,020 | Hill | July 6, 1915 |
| 2,187,496 | Hess | Jan. 16, 1940 |
| 2,424,890 | Howells | July 29, 1947 |
| 2,427,976 | Posson | Sept. 23, 1947 |
| 2,553,338 | Shaw | May 15, 1951 |